United States Patent
Lee

(10) Patent No.: US 10,541,576 B2
(45) Date of Patent: Jan. 21, 2020

(54) ELECTRIC MACHINE WITH NON-SYMMETRICAL MAGNET SLOTS

(71) Applicant: BorgWarner Inc., Auburn Hills, MI (US)

(72) Inventor: Seong Taek Lee, Lexington, KY (US)

(73) Assignee: BorgWarner, Inc., Auburn Hills, MI (US)

( * ) Notice: Subject to any disclaimer, the term of this patent is extended or adjusted under 35 U.S.C. 154(b) by 299 days.

(21) Appl. No.: 15/620,003

(22) Filed: Jun. 12, 2017

(65) Prior Publication Data

US 2018/0358851 A1 Dec. 13, 2018

(51) Int. Cl.
*H02K 1/26* (2006.01)
*H02K 1/27* (2006.01)
*H02K 1/02* (2006.01)

(52) U.S. Cl.
CPC .............. *H02K 1/265* (2013.01); *H02K 1/02* (2013.01); *H02K 1/27* (2013.01); *H02K 1/2766* (2013.01); *H02K 2201/03* (2013.01); *H02K 2213/03* (2013.01)

(58) Field of Classification Search
CPC .... H02K 1/265; H02K 1/02; H02K 1/27; H02K 1/2766; H02K 2201/03; H02K 2213/03
USPC .................................................. 310/216.071
See application file for complete search history.

(56) References Cited

U.S. PATENT DOCUMENTS

| | | | |
|---|---|---|---|
| 6,218,753 B1 | 4/2001 | Asano et al. | |
| 6,239,526 B1 | 5/2001 | Oh et al. | |
| 6,940,205 B1 | 9/2005 | Murakami et al. | |
| 7,233,090 B2 | 6/2007 | Evans et al. | |
| 7,843,100 B2 | 11/2010 | Blissenbach et al. | |
| 7,932,658 B2 | 4/2011 | Ionel | |
| 8,102,091 B2 | 1/2012 | Ionel | |
| 8,174,158 B2* | 5/2012 | Rahman | H02K 1/2766 310/156.53 |
| 8,664,823 B2 | 3/2014 | Vyas et al. | |
| 9,531,226 B2 | 12/2016 | Arimatsu et al. | |
| 2005/0269888 A1 | 12/2005 | Utaka | |
| 2006/0028082 A1* | 2/2006 | Asagara | H02K 1/276 310/156.53 |
| 2008/0231135 A1* | 9/2008 | Suzuki | H02K 1/2766 310/156.53 |

(Continued)

*Primary Examiner* — Forrest M Phillips
(74) *Attorney, Agent, or Firm* — Bose McKinney & Evans LLP

(57) ABSTRACT

An electric machine including a stator and rotor. The rotor has a core wherein each pole includes first and second axially extending magnet slots positioned in an outwardly opening V-shape. Permanent magnets are positioned in the magnet slots. The magnet slots define first and second opposing major edges wherein the first major edge is disposed nearer the outer radial perimeter of the rotor core. First and second opposing minor edges extend between the major edges and the first minor edge is disposed nearer the outer radial perimeter. The first and second slots are reflectively symmetrical with one symmetrical aberration. The symmetrical aberration being formed by an axially extending non-symmetric gap defined by the first major edge of the second magnet slot proximate the first minor edge. Demagnetization may be reduced by operating the machine with the second magnet slot trailing the first magnet slot during rotation of the rotor.

18 Claims, 3 Drawing Sheets

(56) References Cited

U.S. PATENT DOCUMENTS

2009/0224624 A1  9/2009  Kumar et al.

* cited by examiner

ELECTRIC MACHINE WITH NON-SYMMETRICAL MAGNET SLOTS

BACKGROUND

1. Technical Field

The present invention relates to electrical machines and, more particularly, to electrical machines utilizing permanent magnets.

2. Description of the Related Art

Interior permanent magnet electric machines are often employed in hybrid vehicles due in part to their relatively high torque density and efficiency. Such interior permanent magnet electric machines employ a rotor that includes permanent magnets mounted therein to provide the rotor field.

The permanent magnets may take the form of rare earth magnets or ferrite magnets. Ferrite magnets are less expensive. While both forms of magnets are subject to potential demagnetization, ferrite magnets are generally more susceptible to demagnetization.

While known internal permanent magnet electric machines are effective, further improvements remain desirable.

SUMMARY

The present invention provides an electric machine having a rotor with permanent magnets wherein the rotor core structure reduces the demagnetizing effects generated during operation of the machine.

The invention comprises, in one form thereof, an electric machine that includes a stator operably coupled with a rotor rotatable about an axis. The rotor includes a rotor core formed out of magnetically permeable material. The rotor also defines a plurality of poles wherein each pole includes first and second axially extending magnet slots formed in the rotor core and positioned in a radially outwardly opening V-shaped configuration. A first permanent magnet is positioned in the first slot and a second magnet is positioned in the second slot. The first and second magnet slots of each pole having a configuration defining a first major edge and an opposite second major edge, the first major edge being disposed nearer an outer radial perimeter of the rotor core than the second major edge. The first and second slots further defining a first minor edge and an opposite second minor edge, the first minor edge being disposed nearer the outer radial perimeter of the rotor core than the second minor edge, and wherein each of the first and second minor edges extend between the first and second major edges. The first and second slots are reflectively symmetrical with one symmetrical aberration. The one symmetrical aberration being formed by an axially extending non-symmetric gap between the second magnet and the rotor core, the non-symmetric gap being defined by the first major edge of the second magnet slot proximate an intersection of the first major edge with the first minor edge.

In some embodiments, the first and second magnets define a rectangular cross section.

In some embodiments, the rotor rotates in a first direction about the axis during operation and the second magnet slot trails the first magnet slot during rotation of the rotor in the first direction.

In some embodiments, the first and second major edges of the first and second slots each define an engagement section which respectively engages the first and second magnets, the first and second major edges being parallel in the engagement section and wherein the non-symmetric gap extends for a linear distance along the second magnet that is within the range of 14% to 20% of the distance between the first and second major edges in the engagement section. In such an embodiment the first and second magnets may have a rectangular cross section.

In some embodiments, the non-symmetric gap defines an arc in the first major edge of the second slot.

In some embodiments, each of the first and second slots define a plurality of axially extending symmetric gaps between the rotor core and the first and second magnets respectively. In such an embodiment, the symmetric gaps may include four gaps wherein first and second gaps are disposed at opposite ends of the first minor edge, the first gap being disposed proximate the first major edge and the second gap being disposed proximate the second major edge, a third gap is disposed on the second minor edge proximate the second major edge and a fourth gap is disposed on the first major edge proximate the second minor edge; the first and third gaps each being larger than the second and fourth gaps.

In some embodiments, the non-symmetric gap has a relative magnetic permeability of 1.

In some embodiments, the rotor rotates in a first direction about the axis during operation and second magnet slot trails the first magnet slot during rotation of the rotor in the first direction; each of the first and second slots define a plurality of axially extending symmetric gaps between the rotor core and the first and second magnets respectively; and the first and second major edges of the first and second slots each define an engagement section which respectively engages the first and second magnets, the first and second major edges being parallel in the engagement section and wherein the non-symmetric gap extends for a linear distance along the second magnet that is within the range of 14% to 20% of the distance between the first and second major edges in the engagement section.

In such an embodiment, the first and second magnets may have a rectangular cross section. The non-symmetric gap may also define an arc in the first major edge of the second slot. Furthermore, the symmetric gaps of such an embodiment may be configured such that the symmetric gaps of the first and second slots include first and second gaps disposed at opposite ends of the first minor edge, the first gap being disposed proximate the first major edge and the second gap being disposed proximate the second major edge, a third gap disposed on the second minor edge proximate the second major edge and a fourth gap disposed on the first major edge proximate the second minor edge; the first and third gaps each being larger than the second and fourth gaps. In such an embodiment, all of the axially extending symmetric and non-symmetric gaps defined by the first and second slots may have a relative magnetic permeability of 1.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
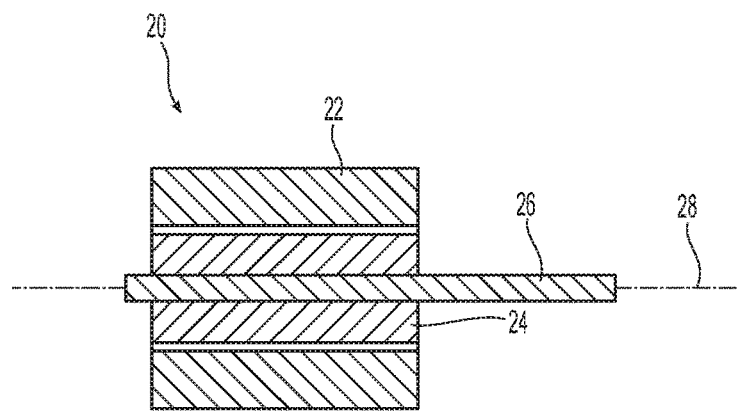
FIG. 1 is a schematic cross sectional view of an electric machine.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION

FIG. 1 provides a schematic cross sectional view of an electric machine 20. Electric machine 20 includes a stator 22 having a stator core and a plurality of windings. A rotor 24 is operably coupled with stator 22 and has a shaft 26 secured thereto. Rotor 24 and shaft 26 rotate relative to stator 22 about axis 28. Electric machine 20 may be employed as a motor/generator in a hybrid vehicle wherein it selectively operates as either a motor or a generator.

Rotor 24 includes a rotor core 30 and defines a plurality of poles 32 which interact with stator 22 during operation of electric machine 20. The illustrated electric machine 20 is an internal permanent magnet electric machine and each of the poles 32 of rotor 24 include first and second axially extending magnet slots 34, 35 formed in rotor core 30 and positioned in a radially outwardly opening V-shaped configuration. A first permanent magnet 36 is positioned in the first slot 34 and a second permanent magnet 37 is positioned in the second slot 35.

In the illustrated embodiment, magnets 36, 37 have a rectangular cross section and have the same size and magnetic properties. The use of a rectangular cross section provides for manufacturing efficiency. Any suitable permanent magnet may be used. For example, magnets 36, 37 may take the form of rare earth magnets or ferrite magnets.

Rotor core 30 formed out of magnetically permeable material. For example, rotor core 30 may be formed out of a plurality of stacked laminations wherein each individual lamination is a sheet of electrical steel. The use of stacked electrical steel laminations to form a rotor core is well known to those having ordinary skill in the art. Electrical steel often has a relative magnetic permeability of around 4,000. By definition, a vacuum has a relative magnetic permeability of 1.

Each of the first and second slots 34, 35 has four edges generally conforming to the rectangular cross section of the magnets 36, 37 while also defining a plurality of axially extending gaps between the rotor core and the magnets. More specifically, first magnet slot 34 includes a first major edge 38 and an opposite second major edge 40. First major edge 38 is located nearer an outer radial perimeter 46 of rotor core 30 than second major edge 40. First magnet slot 34 also has a first minor edge 42 and a second minor edge 44. The minor edges 42, 44 are shorter than the major edges 38, 40 and each of the first and second minor edges 42, 44 extend between the first and second major edges 38, 40. First minor edge 42 is disposed nearer the outer radial perimeter 46 of rotor core 30 than the second minor edge 44.

Figure 2:
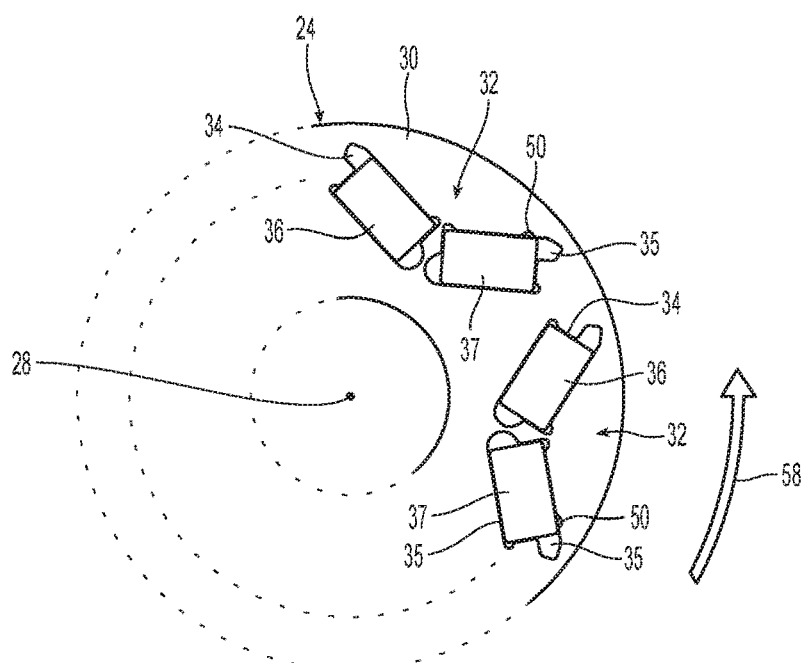
FIG. 2 is a partial end view of a rotor.

Second magnet slot 35 is located clockwise of first magnet slot 34 in FIG. 2 and, similar to first magnet slot 34, second magnet slot 35 includes a first major edge 39 and an opposite second major edge 41. First major edge 39 is located nearer outer radial perimeter 46 of rotor core 30 than second major edge 41. Second magnet slot 35 also has a first minor edge 43 and a second minor edge 45. The minor edges 43, 45 are shorter than the major edges 39, 41 and each of the first and second minor edges 43, 45 extend between the first and second major edges 39, 41. First minor edge 43 is disposed nearer the outer radial perimeter 46 of rotor core 30 than the second minor edge 45.

The first 38, 39 and second 40, 41 major edges of each the first and second slots 34, 35 each define an engagement section 52, 53 which respectively engages the first and second magnets 36, 37. The first 38, 39 and second 40, 41 major edges of each slot are parallel in the engagement section and are spaced apart by a distance, e.g., distance 54, that is equal or only slightly larger than the width of the magnet disposed in the slot. The magnet may be held in the magnets slots by an interference fit between the magnet and the rotor core surfaces defining the first and second major edges. The engagement of the magnet may be indirect with a thin layer of adhesive alternatively, or, additionally be used to secure the magnets within the slots.

First and second magnet slots 34, 35 are reflectively symmetrical about a radial line 48 that passes through axis 28 with one aberration in symmetry. The one symmetrical aberration is formed by an axially extending non-symmetric gap 50 between second magnet 37 and rotor core 30. Non-symmetric gap 50 is defined by the first major edge 39 of the second magnet slot 35 proximate an intersection of the first major edge 39 with the first minor edge 43.

Non-symmetric gap 50 defines a portion of a curve, or arc, in the first major edge 39 of second magnet slot. The arc defined by gap 50 extends for a linear distance 56 along the second magnet 37 that is within the range of ⅐ to ⅕ (14% to 20%) of the distance 54 between the first and second major edges 30, 41 in the engagement section 53.

Figure 3:
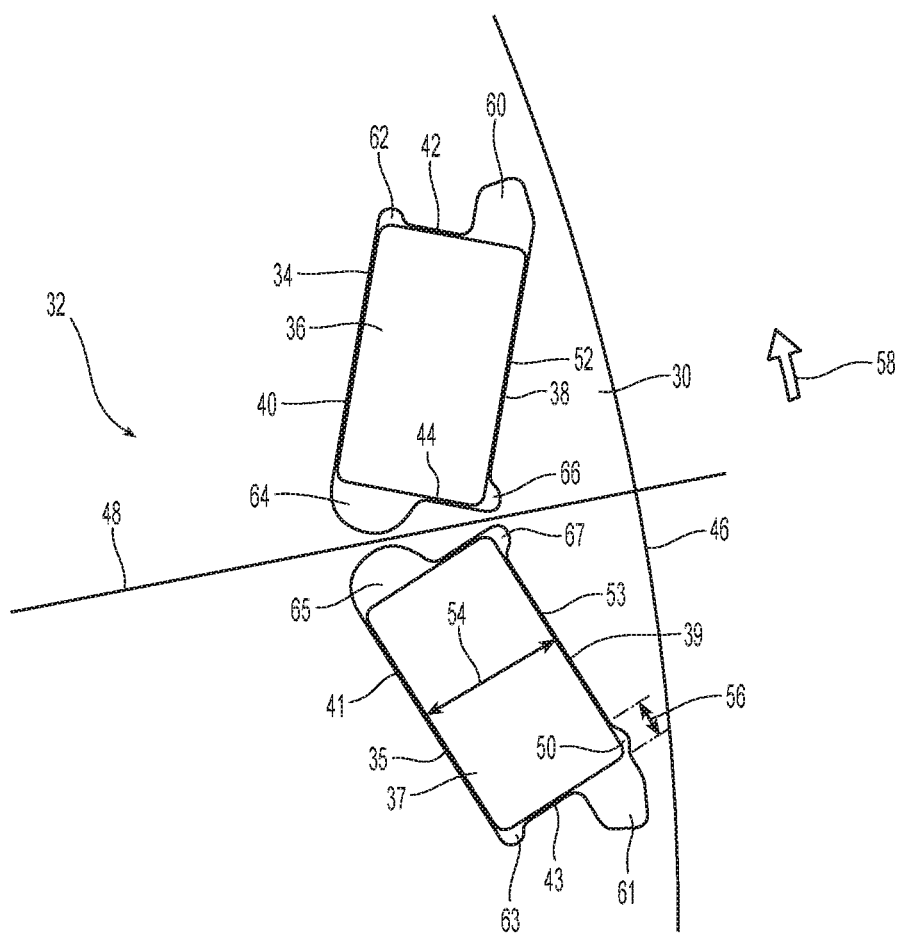
FIG. 3 is a partial end view of a rotor showing a single pole.

The functionality of the non-symmetric gap is dependent, in part, on the rotational direction of electric machine 20. When electric machine 20 is operated such that non-symmetric gap 50 is located on the trailing magnet slot, it will reduce the demagnetizing effects of the electromagnetic field generated by the operation of electric machine 20 on magnets 36, 37 as further discussed below. In other words, non-symmetric gap 50 provides such benefits when rotor 24 rotates in a first rotational direction 58 about axis 28 during operation of electric machine 20 and second magnet slot 35 trails first magnet slot 34 during rotation of rotor 24 in the first rotational direction 58 as depicted in FIGS. 2 and 3.

The use of a non-symmetric gap 50 is most advantageous when used with an electric machine that rotates in only a single direction when operating whereby gap 50 will always be on the trailing slot. However, gap 50 may also be employed with electric machines which will operate in both rotational directions. In such applications, if it is possible to predict the operational characteristics of the electric machine, it will generally be desirable to locate gap 50 such that it be in the trailing position for the majority of the time that the electric machine is operating. In some applications, however, if the electric machine will be operating under light conditions in one direction for a majority of the time and under greater loads in the opposite direction for less than a majority of the time, the effects of operation may be greater under the greater loads. In such an application, it could be more beneficial to locate gap 50 such that it was on the trailing slot for the rotational direction when the greater loads are anticipated.

In addition to gap 50, first and second magnet slots 34, 35 further define a plurality of axially extending gaps between rotor core 30 and magnets 36, 37 that are disposed in a reflectively symmetrical manner about line 48. These symmetric gaps of the first and second slots 34, 35 include first and second gaps disposed at opposite ends of the first minor edge 42, 43. The first gap 60, 61 is disposed proximate the first major edge 38, 39 and the second gap 62, 63 is disposed proximate the second major edge 40, 41. A third gap 64, 65 of each respective slot is disposed on the second minor edge 44, 45 proximate the second major edge 40, 41. While a fourth gap 66, 67 of each respective slot is disposed on the first major edge 38, 39 proximate the second minor edge 44, 45. The first 60, 61 and third 64, 65 gaps of each slot are larger than the second 62, 63 and fourth 66, 67 gaps.

1 Gap 50 and each of the symmetric gaps 60-67 have a relative magnetic permeability less than that of the rotor core 30. For example, gaps 50, 60-67 may be filled with air. Air has a relative magnetic permeability of 1.00000037. Which, for purposes of this disclosure can be rounded to the nearest whole number, i.e., 1. Instead of leaving gaps 50, 60-67 as air-filled voids, it is also possible to fill these gaps with a polymeric and/or adhesive material which may be used to further secure the magnets within the slots. Advantageously, the material used to fill the gaps 50, 60-67 has a relative magnetic permeability of 1.

Figure 4:
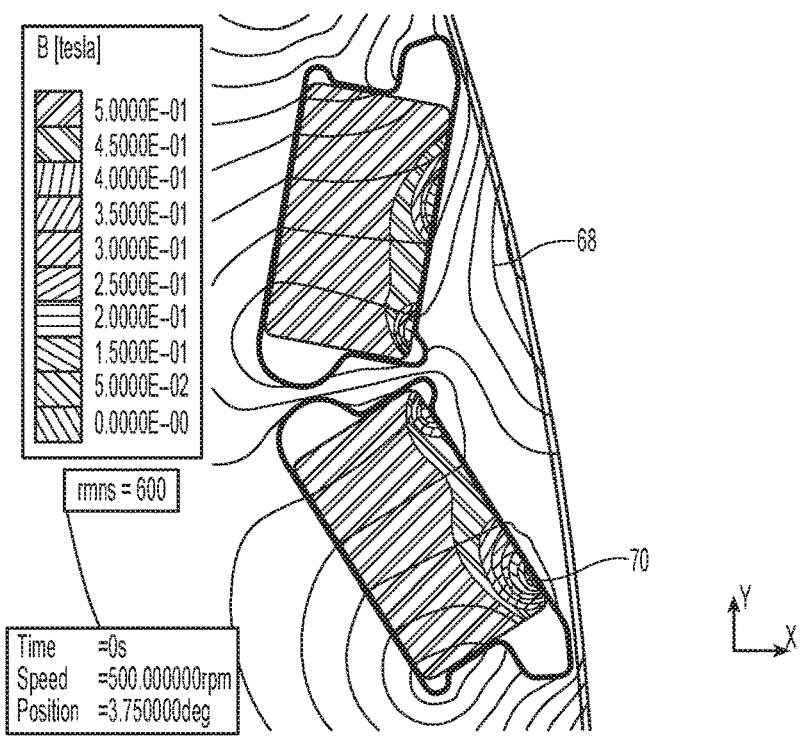
FIG. 4 is a partial end view of a PRIOR ART rotor depicting magnetic field properties during operation.
Figure 5:
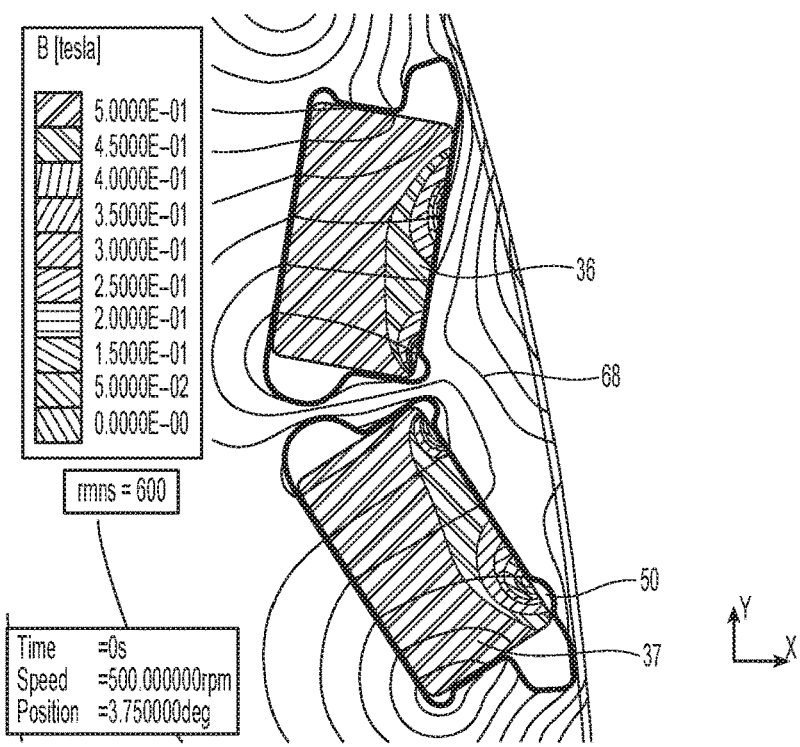
FIG. 5 is a partial end view of the rotor of FIG. 2 depicting magnetic field properties during operation.

FIGS. 4 and 5 show how the use of a gap 50 reduces the demagnetizing effects of electric machine operation. FIGS. 4 and 5 display the calculated results of operating electric machines under given conditions. The design of the electric machines used to obtain the calculated results shown in FIGS. 4 and 5 are identical except for the presence of a non-symmetrical gap 50 in the design of FIG. 5. FIG. 4 shows the results for a prior art design that uses reflectively symmetrical magnet slots without a non-symmetric aberration.

Both FIGS. 4 and 5 illustrate the condition wherein the electric machine is being operated as a motor, the rotor is rotating at 500 rpm in a direction counterclockwise as viewed in FIGS. 4 and 5 and the current draw of the electric machine is 600 $A_{rms}$. $A_{rms}$ is the root mean square of the Amps being drawn by the electric machine. Under real world conditions, the current draw may vary slightly and the use of the $A_{rms}$ draw current provides a meaningful average value. Magnetic field lines 68 are also shown in FIGS. 4 and 5. The use of gaps 60-67 is useful in purposely shaping magnetic field lines 68.

The calculated strength of magnetic field B (measured in tesla) within the magnets is represented by different types of cross hatching in FIGS. 4 and 5. As shown in the legend, the different types of cross hatching may represent values between $5 \times 10^{-1}$ tesla down to zero tesla. When such values become excessively low, the risk of demagnetization of the magnet is increased. Demagnetization of the magnets is dependent upon a number of factors in addition to the magnetic field B. For example, the temperature of the magnets is also a factor. In the depicted examples, it is desirable to maintain the magnetic field B above $1.5 \times 10^{-1}$ tesla to reduce the risk of demagnetization. The area designated by reference numeral 70 in FIG. 4 is below this value. The embodiment of FIG. 5 does not include any areas in the magnet cross section that has fallen below threshold value of $1.5 \times 10^{-1}$ tesla. In this regard it is noted that non-symmetrical gap 50 of FIG. 5 is positioned adjacent the area where area 70 is located in FIG. 4. Gap 50 reduces the direct armature reaction generated by the stator windings in this area to thereby maintain the magnetic field strength above the threshold value.

The use of gap 50 with the embodiment of FIG. 5 also provided advantages over the embodiment of FIG. 4 with regard to cogging torque and torque ripple. More specifically, it reduced the cogging torque from 9.15 Nm to 5.65 Nm (a reduction of 38.25%). Furthermore, it reduced the torque ripple from 7.05 Nm to 6.37 Nm (a reduction of 9.64%) at 100 $A_{rms}$; from 17.65 Nm to 15.17 Nm (a reduction of 14.05%) at 200 $A_{rms}$; and from 23.74 Nm to 20.76 Nm (a reduction of 12.55%) at 300 $A_{rms}$.

The use of gap 50 thereby provides several advantages. For example, it allows the electrical machine to be operated at a heavier load before incurring an excessive risk of demagnetization. The width of the magnet is another factor in determining the risk of demagnetization, and the use of a gap 50 facilitates the use of magnets having a smaller width.

While this invention has been described as having an exemplary design, the present invention may be further modified within the spirit and scope of this disclosure. This application is therefore intended to cover any variations, uses, or adaptations of the invention using its general principles.

What is claimed is:

1. An electric machine comprising:
   a stator operably coupled with a rotor rotatable about an axis;
   wherein the rotor includes a rotor core formed out of magnetically permeable material, the rotor defining a plurality of poles, wherein each pole includes first and second axially extending magnet slots formed in the rotor core and positioned in a radially outwardly opening V-shaped configuration with a first permanent magnet being positioned in the first slot and a second magnet being positioned in the second slot;
   the first and second magnet slots of each pole having a configuration defining a first major edge and an opposite second major edge, the first major edge being disposed nearer an outer radial perimeter of the rotor core than the second major edge; the first and second slots further defining a first minor edge and an opposite second minor edge, the first minor edge being disposed nearer the outer radial perimeter of the rotor core than the second minor edge, wherein each of the first and second minor edges extend between the first and second major edges and wherein the first and second slots are reflectively symmetrical with one symmetrical aberration, the one symmetrical aberration being formed by an axially extending non-symmetric gap between the second magnet and the rotor core, the non-symmetric gap being defined by the first major edge of the second magnet slot proximate an intersection of the first major edge with the first minor edge and wherein the first major edge of the first magnet slot engages the first magnet in an area corresponding to the one symmetrical aberration.

2. The electric machine of claim 1 wherein the first and second magnets define a rectangular cross section.

3. The electric machine of claim 1 wherein the rotor rotates in a first rotational direction about the axis during operation and the second magnet slot trails the first magnet slot during rotation of the rotor in the first rotational direction.

4. The electric machine of claim 1 wherein the first and second major edges of the first and second slots each define an engagement section which respectively engages the first and second magnets, the first and second major edges being parallel in the engagement section and wherein the non-symmetric gap extends for a linear distance along the second magnet that is within the range of 14% to 20% of the distance between the first and second major edges in the engagement section.

5. The electric machine of claim 4 wherein the first and second magnets have a rectangular cross section.

6. The electric machine of claim 1 wherein the non-symmetric gap defines an arc in the first major edge of the second slot.

7. The electric machine of claim 1 wherein each of the first and second slots define a plurality of axially extending symmetric gaps between the rotor core and the first and second magnets respectively.

8. The electric machine of claim 7 wherein the symmetric gaps of the first and second slots include first and second gaps disposed at opposite ends of the first minor edge, the first gap being disposed proximate the first major edge and the second gap being disposed proximate the second major edge, a third gap disposed on the second minor edge proximate the second major edge and a fourth gap disposed on the first major edge proximate the second minor edge; the first and third gaps each being larger than the second and fourth gaps.

9. The electric machine of claim 1 wherein non-symmetric gap has a relative magnetic permeability of 1.

10. The electric machine of claim 1 wherein the rotor rotates in a first direction about the axis during operation and second magnet slot trails the first magnet slot during rotation of the rotor in the first direction;
wherein each of the first and second slots define a plurality of axially extending symmetric gaps between the rotor core and the first and second magnets respectively; and
wherein the first and second major edges of the first and second slots each define an engagement section which respectively engages the first and second magnets, the first and second major edges being parallel in the engagement section and wherein the non-symmetric gap extends for a linear distance along the second magnet that is within the range of 14% to 20% of the distance between the first and second major edges in the engagement section.

11. The electric machine of claim 10 wherein the first and second magnets have a rectangular cross section.

12. The electric machine of claim 11 wherein the non-symmetric gap defines an arc in the first major edge of the second slot.

13. The electric machine of claim 12 wherein the symmetric gaps of the first and second slots include first and second gaps disposed at opposite ends of the first minor edge, the first gap being disposed proximate the first major edge and the second gap being disposed proximate the second major edge, a third gap disposed on the second minor edge proximate the second major edge and a fourth gap disposed on the first major edge proximate the second minor edge; the first and third gaps each being larger than the second and fourth gaps.

14. The electric machine of claim 13 wherein all of the axially extending symmetric and non-symmetric gaps defined by the first and second slots have a relative magnetic permeability of 1.

15. The electric machine of claim 1 wherein the one symmetrical aberration is the only symmetrical aberration.

16. The electric machine of claim 15 wherein the rotor rotates in a first rotational direction about the axis during operation and the second magnet slot trails the first magnet slot during rotation of the rotor in the first rotational direction.

17. The electric machine of claim 16 wherein the first and second permanent magnets have the same size and magnetic properties and are reflectively symmetrically positioned.

18. The electric machine of claim 1 wherein the first and second permanent magnets have the same size and magnetic properties and are reflectively symmetrically positioned.

\* \* \* \* \*